United States Patent
Kish et al.

[15] 3,659,902
[45] May 2, 1972

[54] PROPORTIONING VALVE

[72] Inventors: George R. Kish, Owosso; Edward L. Volker, Swartz Creek, both of Mich.

[73] Assignee: Midland-Ross Corporation, Cleveland, Ohio

[22] Filed: July 15, 1970

[21] Appl. No.: 55,117

Related U.S. Application Data

[63] Continuation-in-part of Ser. No. 874,483, Nov. 6, 1969, abandoned.

[52] U.S. Cl. ...................303/6 C, 60/54.5 E, 137/505.18, 137/493.2, 137/493.3, 188/349
[51] Int. Cl. .........................................B60t 8/26, B60t 11/34
[58] Field of Search ..................303/6 C; 60/54.5 E; 188/349; 137/505.18, 493.2, 493.3

[56] References Cited

UNITED STATES PATENTS

| | | | |
|---|---|---|---|
| 3,480,333 | 11/1969 | Stelzer | 303/6 C |
| 3,395,537 | 8/1968 | Stelzer | 303/6 C X |
| 3,394,546 | 7/1968 | Stelzer | 303/6 C X |
| 3,464,741 | 9/1969 | Falk | 303/6 C |

*Primary Examiner*—Milton Buchler
*Assistant Examiner*—John J. McLaughlin
*Attorney*—Malcolm R. McKinnon

[57] ABSTRACT

A proportioning valve for use in hydraulic brake systems of automotive vehicles, the proportioning valve being interposed between the master cylinder and the actuators of the rear brakes of the vehicle and incorporating improved means effective to establish a fluid pressure differential between the front and rear brake actuators in the higher ranges of fluid pressure applied by the master cylinder and to increase the pressure differential at a linear rate as the master cylinder pressure increases in such higher range.

14 Claims, 5 Drawing Figures

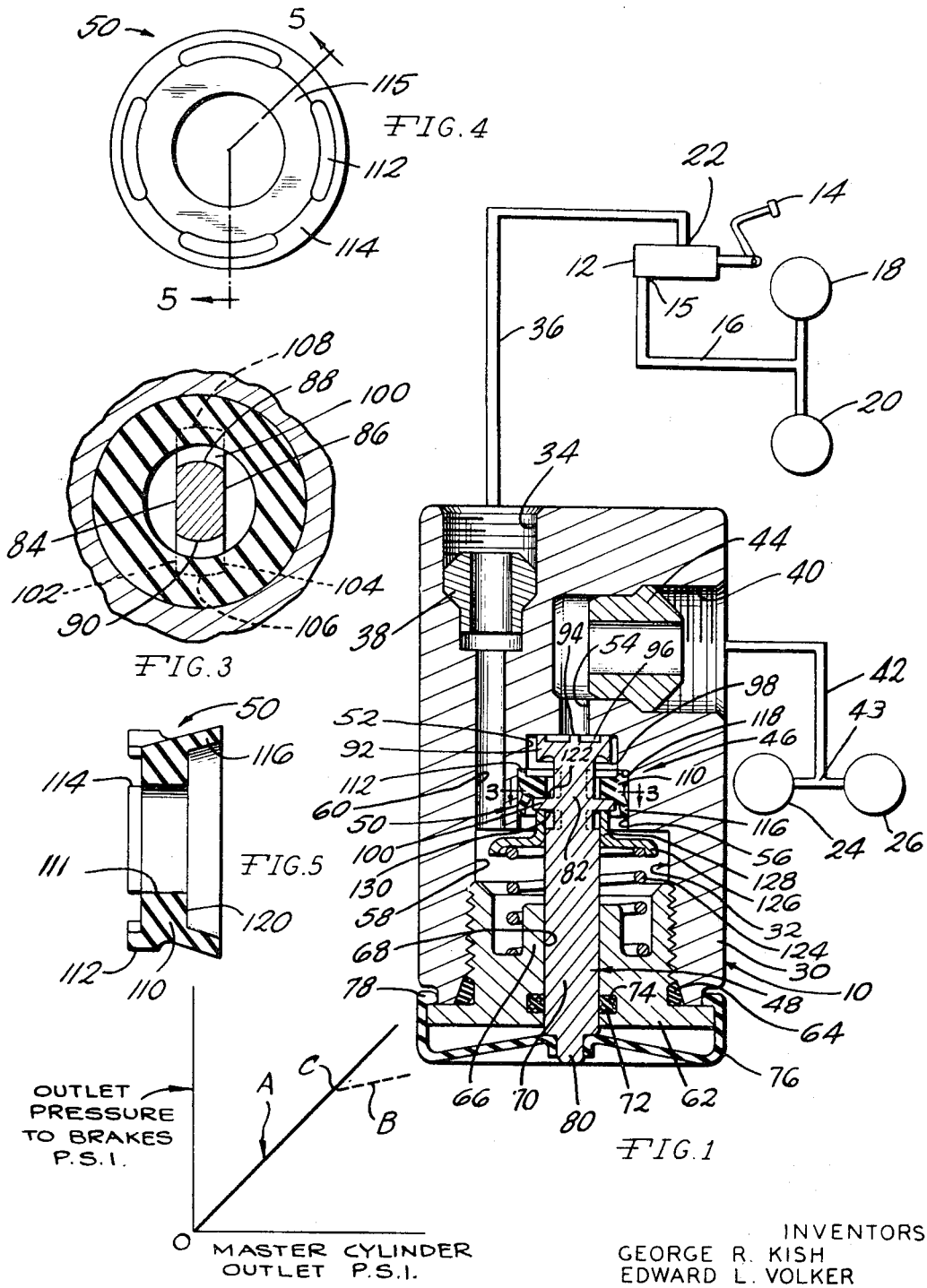
Patented May 2, 1972
3,659,902
INVENTORS
GEORGE R. KISH
EDWARD L. VOLKER
BY
Miller, Morriss, Pappas & McLeod
ATTORNEYS

PROPORTIONING VALVE

This application is a continuation-in-part of the applicants' co-pending application, Ser. No. 874,483 filed Nov. 6, 1969 now abandoned for Proportioning Valve and assigned to the assignee of the present invention.

BRIEF SUMMARY OF THE INVENTION

This invention relates to hydraulic brake systems for automotive vehicles and, more particularly, to an improved proportioning valve particularly adapted for use in hydraulic automotive brake systems and effective to establish a fluid pressure differential between the front and rear brake actuators of the vehicle in the higher ranges of pressure applied by the vehicle master cylinder and to increase the pressure differential at a linear rate as the master cylinder pressure increases in such higher range.

As is well known in the art, during deceleration of an automotive vehicle, a portion of the weight borne by the rear wheels of the vehicle is transferred to the front wheels of the vehicle and as a result of such weight transfer, the maximum braking effort which the rear wheels are capable of applying is reduced and the maximum braking effort which the front wheels are capable of applying is increased. Consequently, it is desirable to deliver higher brake fluid pressure to the front brake actuators of the vehicle than to the rear brake actuators of the vehicle during high rates of deceleration such as are encountered during panic stops so that the skidding tendencies of the rear wheels are reduced, control of the vehicle may be maintained and the stopping distance decreased. Heretofore, various pressure proportioning valves have been proposed for hydraulic brake systems of automobiles, the proportioning valves being adapted to reduce the relative pressurization of the rear brake actuators of the vehicle with respect to the pressurization of the front brake actuators in the higher ranges of applied brake pressure.

Prior proportioning valves of the indicated character have been subject to the defect that they utilize extremely complicated and intricate interrelated valve components which are complex, expensive to manufacture, and have numerous tortuous fluid paths that are difficult to analyse and vary to meet the requirements of different automobiles.

An object of the present invention is to overcome disadvantages in prior proportioning valves of the indicated character and to provide an improved proportioning valve which is particularly adapted for use in automotive vehicle hydraulic brake systems and which is relatively simple in construction and effective to establish a fluid pressure differential between the front and rear brake actuators in the higher ranges of pressure applied by the master cylinder of the vehicle and to increase the pressure differential at a linear rate as the master cylinder pressure increases in such higher pressure range.

Another object of the invention is to provide an improved proportioning valve incorporating improved valve means for controlling the braking action of an automotive vehicle during relatively high rates of deceleration.

Another object of the invention is to provide an improved proportioning valve incorporating improved valve means for modulating the pressure applied to the rear brake actuators of an automotive vehicle during rapid deceleration conditions.

Another object of the invention is to provide an improved proportioning valve that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a cross-sectional view of a proportioning valve embodying the present invention, showing the same in association with schematically illustrated components of an automotive vehicle hydraulic brake system;

FIG. 2 is a graph illustrating the manner in which the pressure curves at the front and rear brake actuators diverge as a result of the operation of the proportioning valve embodying the present invention;

FIG. 3 is an enlarged cross-sectional view of a portion of the structure illustrated in FIG. 1, taken on the line 3—3 thereof;

FIG. 4 is a top view of the annular valve embodied in the structure illustrated in FIG. 1, showing the same removed therefrom; and FIG. 5 is a cross-sectional view of the annular valve illustrated in FIG. 4, taken on the line 5—5 thereof.

DETAILED DESCRIPTION

Referring to the drawings, a proportioning valve, generally designated 10, is illustrated embodying the present invention, the proportioning valve 10 having particular utility in hydraulic brake systems of automotive vehicles of the type illustrated diagrammatically in FIG. 1. In such systems, which are conventionally known as dual brake systems, hydraulic fluid is delivered from a dual master cylinder 12 actuated by a conventional brake pedal 14, a power booster (not shown) being interposed, if desired, between the brake pedal 14 and the master cylinder 12 to boost the manual effort applied by the driver of the vehicle. Hydraulic fluid is delivered from the outlet 15 of the dual master cylinder through a line 16 to the brake actuators or wheel cylinders 18 and 20 at the front wheels of the vehicle and hydraulic fluid is also delivered from the outlet 22 of the dual master cylinder to the brake actuators 24 and 26 provided at the rear wheels of the vehicle, the proportioning valve 10 being interposed between the dual master cylinder 12 and the actuators 24 and 26 of the rear wheel brakes. The dual master cylinder 12 and the brake actuators 18, 20, 24 and 26 are of conventional construction and operation and their use is so well known in the art that a detailed description is not required for a full understanding of the present invention.

The proportioning valve 10 embodying the present invention is comprised of a body 30 defining a stepped bore 32. An inlet port 34 is provided which is connected by a line 36 to the outlet 22 of the dual master cylinder 12 as illustrated diagrammatically in FIG. 1, a flare fitting such as 38 being provided at the inlet port 34 of the body 30 to facilitate connection of the proportioning valve to the line 36. As previously mentioned, the outlet 15 of the dual master cylinder 12 is connected to the front wheel brake actuators 18 and 20 by the line 16. The body 30 of the proportioning valve 10 also includes an outlet port 40 connected to the rear wheel brake actuators 24 and 26 by a line 42 having a suitable T-connection 43 to the rear wheel brake actuators 24 and 26. A flare fitting such as 44 is provided at the port 40 to facilitate connection of the line 42 to the body of the proportioning valve.

A valve assembly, generally designated 46, is provided that includes a pressure responsive member or piston 48 (which is preferably formed of metal or other suitable material having sufficient strength to withstand the forces exerted thereon) and an annular, resilient valve element 50 (which is preferably formed of rubber or other suitable resilient material), the pressure responsive member or piston 48 and the annular valve element 50 being disposed in the stepped bore 32 and being adapted to control communication between the inlet port 34 and the outlet port 40 as will be described hereinafter in greater detail.

The stepped bore 32 defined by the body 10 includes a reduced diameter portion 52 at the inner end thereof which communicates with the outlet port 40 through a passageway 54 defined by the body 10. The stepped bore 32 also includes an intermediate portion 56 which is larger in diameter than the portion 52 while the lower end portion 58 of the stepped bore 32 is larger in diameter than the portion 56 and communicates with the inlet port 34 through a passageway 60 defined by the body 10. The lower end portion 58 of the stepped bore is closed by a cap 62 which threadably engages the body 10, an 0-ring 64 being interposed between the cap 62 and the body 10 to provide a fluid tight seal sealing the threaded connection between the cap 62 and the body 10. The central portion 66 of the cap 62 defines an axially extending bore 68 adapted to receive the cylindrical stem portion 70 of the pressure responsive member 48 for reciprocating movement therein, a conventional quad-ring seal 72 being provided which is disposed in a groove 74 defined by the central portion 66 of the cap, the quad-ring seal 72 providing a double acting fluid tight dynamic seal between the stem portion 70 of the pressure responsive member and the cap. A boot 76 is secured to the end cap 62 by an integral flange 78, the boot surrounding the lower end portion 80 of the piston stem 70 and functioning to prevent the entrance of foreign material into the bore 68 defined by the central portion of the cap.

As shown in FIGS. 1 and 3, in addition to the cylindrical stem 70, the pressure responsive member 48 includes an integral intermediate portion 82 having opposed flat sides 84 and 86 joined by curvilinear surfaces 88 and 90 which are preferably formed as arcs of a circle, the intermediate portion 82 in turn being integral with a head portion 92, the upper end of which is of castellated form having angularly spaced projections 94 defining annularly spaced fluid passageways 96 therebetween. The head portion 92 also includes an annular axially extending lip portion 98 which is greater in diameter than the stem portion 70 and which projects downwardly as viewed in FIG. 1.

The pressure responsive member 48 also includes a radially extending flange portion 100 having flat sides 102 and 104 preferably disposed in the planes of the flat sides 84 and 86, respectively, of the intermediate portion 82 of the pressure responsive member and being joined by curvilinear surfaces 106 and 108 preferably formed as arcs of a circle concentric with but greater in diameter than the curvilinear surfaces 88 and 90 of the central portion 82, the radius of curvature of the curvilinear portions 106 and 108 being less than the radius of curvature of the cylindrical section 56 of the stepped bore 32 as shown in FIGS. 1 and 3.

As shown in FIGs. 1, 4 and 5, the annular valve element 50 includes a body 110 defining a centrally disposed bore 111, the upper end of the body being of castellated form to define angularly spaced upwardly extending projections 112 defining angularly spaced fluid passageways 114 therebetween around the periphery of the upper sealing surface 115 of the body 110. The annular valve element 50 also includes a skirt portion 116 which projects angularly outwardly and downwardly from the body portion, as viewed in FIG. 1, and engages the internal wall of the body defining the intermediate section 56 of the stepped bore 32, the annular valve 50 being disposed in the intermediate portion 56 of the step bore so that the upper ends of the projections 112 bear against the shoulder 118 provided on the body portion between the intermediate portion 56 and the reduced diameter portion 52 of the stepped bore. The lower edge 120 of the body portion of the annular valve bears against the upper surface 122 of the flange portion 100 of the pressure responsive member 48.

As shown in FIG. 1, the pressure responsive member 100 is biased upwardly by a coil spring 124 the lower end portion of which bears against the cap member 62 while the upper end portion of the spring 124 bears against a spring retainer 126, the spring retainer having an axially extending flange portion 128 the upper end of which bears against the lower surface 130 of the flange portion 100 of the pressure responsive member 48.

In the operation of the proportioning valve 10, assuming an initial condition in which no pedal pressure is being applied to the brake pedal 14, the components of the proportioning valve 10 will be disposed in the positions illustrated in FIG. 1. The graph of FIG. 2 will be referred to in conjunction with the operation of the proportioning valve 10 to indicate the relationship between the pressures at the outlets 15 and 22 of the master cylinder and the pressure at the outlet port 40 leading to the rear wheel brake actuators 24 and 26 of the vehicle.

The origin or point 0 of FIG. 2 indicates the condition when no manual force is applied to the brake pedal 14, it being understood that in conventional practice the dual master cylinder 12 will have a residual pressure maintained by a residual check valve (not shown) when the proportioning valve is used on a vehicle equipped with drum brakes at the rear wheels so that the rear wheel brake system of the vehicle is maintained under a slight pressure even though no manual force is applied to the brake pedal 14 thereby preventing the entrance of air into the rear brake system. For purposes of illustration however the residual brake pressure is indicated as zero at the origin of the graph of FIG. 2. When the vehicle is equipped with disc brakes at the rear wheels, a residual check valve is not conventionally utilized.

Upon application of manual force to the brake pedal 14, the pressure from the outlets 15 and 22 will follow the curve A indicated by the solid line while the pressure from the outlet port 40 will follow the solid line (curve A) from the origin to the point C and thereafter will follow the dashed curve B so that a fluid pressure differential is established between the front and rear brake actuators in the higher ranges of pressure applied by the master cylinder, the pressure differential being increased at a linear rate as the master cylinder pressure increases in the higher range. As increased manual force is applied to the brake pedal 14 the pressure from the outlets 15 and 22 will continue to follow the curve A indicated in solid line beyond the point C so that the pressure at the outlet 15 of the master cylinder 12 is applied to the front wheel actuating cylinders 18 an 20 through the line 16 but the pressure from the outlet 22 of the master cylinder is modulated by the proportioning valve 10 and consequently the pressure applied to the rear wheel brake actuators 24 and 26 follows the dashed line B. Communication to the rear wheel cylinders 24 and 26 effected from the outlet 22 of the master cylinder through the line 36; the inlet port 34; the passageway 60; the portion 58 of the stepped bore; the passageway defined between the central portion 82 of the pressure responsive member 48 and the wall of the central bore 111 of the annular valve member 50; the reduced diameter portion 52 of the stepped bore; and the passageways 96 and 54 to the outlet port 40 of the proportioning valve from which the fluid flows through the line 42 to the rear wheel actuating cylinders 24 and 26. At this stage of operation, the upper ends of the projections 94 on the head portion 92 of the pressure responsive member 48 remain in engagement with the shoulder at the upper end of the stepped bore due to the biasing action of the spring 124, and the rib 98 remains substantially in the position illustrated in FIG. 1 and out of contact with the upper sealing surface 115 of the annular valve 50. As the pressure increases in the stepped bore 32, the fluid pressure acting on the pressure responsive member 48, the effective area of which at this stage of operation is determined by the diameter of the stem portion 70, tends to move the pressure responsive member downwardly against the biasing action of the spring 124. The spring 124 is calibrated so that the rib 98 of the pressure responsive member does not engage the sealing surface 115 of the annular valve 50 until the desired pressure indicated by the point C on the curve A is reached. At such time, the rib 98 contacts the sealing surface 115 of the annular valve 50, thereby closing communication between the intermediate portion 56 of the stepped bore 32 and the reduced diameter portion 52 thereof through the bore 111 of the annular valve between the intermediate portion 100 of the pressure responsive member and the internal wall of the annular valve defining the bore 111. Thus the fluid path from the inlet port 34 to the outlet port 40 remains open until the fluid pressure delivered from the outlet port 22 of the master cylinder to the stepped bore 32 reaches a predetermined value. When such value is reached, the annular lip 98 closes against the upper sealing surface 115 of the annular valve, the degree of pressure at which this occurs being dependent upon the force exerted by the spring 124 on the pressure responsive member as compared with the effective area of the pressure responsive member as determined by the cross-sectional diameter of the stem portion 70 of the pressure responsive member dynamically sealed in the bore 68. Thus during the lower ranges of applied master cylinder pressure, the pressure acting downwardly on the effective area of the pressure responsive member produces a downward force which is insufficient to overcome the force of the spring 124 exerted upwardly against the flange 100 of the pressure responsive member.

After the lip 98 closes against the upper sealing surface 115 of the annular valve 50, and the fluid pressure at the inlet port 34 is further increased by the master cylinder due to increased manual effort applied by the vehicle driver to the brake pedal 14, the increased fluid pressure will act against the pressure responsive member in a direction tending to unseat the annular rib 98 from the sealing surface 115 of the annular valve 50, the effective area of the pressure responsive member at this time being determined by the effective diameter of the annular rib 98 sealing against the surface 115 of the annular valve 50 minus the area of the stem 70. The pressure acting against such effective area produces a force acting on the pressure responsive member tending to assist the spring 124 to unseat the annular rib 98 of the pressure responsive member from the sealing surface 115 of the annular valve 50 so that a portion of the increased fluid pressure is delivered to the outlet port 40. Such increased fluid pressure, of course, tends to act downwardly on the pressure responsive member to produce a force, determined by the cross-sectional area of the stem portion 70, opposing the biasing action of the spring 124. This tends to reclose the annular lip 98 against the upper sealing surface 115 of the annular valve. The annular lip 98 of the pressure responsive member 48 thus opens and closes against the sealing surface 115 of the annular valve thereby modulating the pressure at the outlet port 40 so that the pressure at the outlet port 40 increases at a lower rate than the pressure applied by the master cylinder with the result that the pressure applied to the rear brake actuating cylinder 24 and 26 follows the dashed line curve B from the point C as the master cylinder pressure increases in the higher range. Accordingly, the fluid pressure existing at the front brake cylinders 18 and 20 will be greater than the fluid pressure at the rear brake actuating cylinders 24 and 26 when the brakes are applied with a force greater than that necessary to move the annular lip 98 of the pressure responsive member against the sealing surface 115 of the annular valve in opposition to the spring 124.

Upon a decrease in manual force applied to the brake pedal 14, the pressure in the sections 56 and 58 of the stepped bore tending to move the pressure responsive member upwardly is reduced because of the increased volume then provided in the master cylinder. As the pressure in the sections 56 and 58 is reduced, the pressure responsive member 48 and the sealing surface 115 move downwardly thus increasing the volume on the outlet side thereof which in turn proportionally reduces the pressure on the outlet side. When the decreasing pressure in the outlet side, acting on its appropriate effective area, cannot support the load imposed by the spring 124, the lip 98 moves upwardly away from the sealing surface 115 and reopens the passageway through the bore 111 of the annular valve so that the pressure applied to the front and rear brake actuators is equalized and the components of the proportioning valve 10 return to the positions illustrated in FIG. 1.

Important advantages of the above described construction reside in the fact that the dimensions of the pressure responsive member can be accurately controlled and inspected during manufacture and that the configuration of the annular valve member has been greatly simplified as compared with the prior art thereby reducing the cost thereof. Moreover, since the intermediate portion 82 and the flange portion 100 of the pressure responsive member are provided with opposed flat sides, a straight, rather than a tortuous fluid path, is provided through the bore 111 of the annular valve member. In addition, the sealing surface provided by the annular rib or lip 98 on the pressure responsive member does not engage the adjacent end of the annular valve with a rubbing action with the result that the useful life of the proportioning valve 10 is materially increased.

While a preferred embodiment of the invention has been illustrated and described, it will be understood that various changes and modifications may be made without departing from the spirit of the invention.

What is claimed is:

1. In a pressure proportioning valve, the combination including a body defining a bore, said body also defining an inlet port and an outlet port communicating with said bore, valve means disposed in said bore and controlling the flow of fluid between said inlet port and said outlet port, said valve means comprising an annular valve defining a passageway therethrough and having an annular seat surrounding said passageway, and a pressure responsive member having an annular sealing surface engageable with said seat and an intermediate portion extending through said passageway in spaced relationship with respect to said annular valve, said pressure responsive member also including a radially extending portion engageable with said annular valve and having maximum and minimum transverse dimensions, the maximum transverse dimension of said radially extending portion being greater than the maximum transverse dimension of the passageway defined by said annular valve, the minimum transverse dimension of said radially extending portion being less than the minimum transverse dimension of said passageway whereby fluid is permitted to flow through said passageway when said sealing surface is disengaged from said seat, and resilient means biasing said sealing surface away from said seat whereby said valve means is effective to establish a fluid pressure differential between said inlet port and said outlet port and to increase the pressure differential as the fluid pressure at said inlet port increases.

2. The combination as set forth in claim 1 wherein said intermediate portion and said radially extending portion of said pressure responsive member are each provided with spaced substantially flat sides determining the minimum transverse dimensions thereof.

3. The combination as set forth in claim 2 wherein adjacent flat sides of said intermediate portion and said radially extending portion are substantially co-planar.

4. The combination as set forth in claim 1 wherein the effective area of said pressure responsive member when said annular sealing surface engages said seat is greater than the effective area of said pressure responsive member when said sealing surface is disengaged from said seat.

5. The combination as set forth in claim 1 wherein the maximum transverse dimension of said radially extending portion is one plane is greater than the diameter of said passageway and less than the diameter of said bore and the maximum transverse dimension of said radially extending portion in a plane normal to said one plane is less than the diameter of said passageway whereby flow of fluid is permitted through said passageway when said sealing surface is disengaged from said seat and said radially extending portion engages said annular valve.

6. The combination as set forth in claim 5 wherein one end portion of said annular valve is of castellated form and is provided with angularly spaced projections defining angularly spaced fluid paths therebetween.

7. The combination as set forth in claim 6 wherein said annular valve includes a depending skirt portion engaging a portion of said body defining said bore and extending in a direction towards said inlet whereby a higher fluid pressure at said inlet than said outlet will bias said skirt against said body.

8. In a pressure proportioning valve, the combination including a body defining a bore having a fluid inlet and a fluid outlet communicating with said bore, valve means disposed in said bore and controlling the flow of fluid between said inlet and said outlet, said valve means comprising an annular valve defining a centrally disposed passageway therethrough and having an annular valve seat surrounding said passageway and disposed intermediate said inlet and said outlet, and a piston mounted for reciprocation in said bore, said piston having an annular rib engageable with said seat and an intermediate portion extending through said annular valve in spaced relationship with respect thereto, said piston also including a radially extending flange portion having maximum and minimum transverse dimensions, the maximum transverse dimension of said flange portion being greater than the maximum transverse dimension of the passageway defined by said annular valve, the minimum transverse dimension of said flange being less than the minimum transverse dimension of the passageway defined by said annular valve whereby fluid is permitted to flow through said passageway when said rib is disengaged from said seat, and resilient means biasing said annular rib away from said seat whereby said piston is effective to counteract said resilient means when the pressure of said outlet reaches a predetermined value and cooperate with said annular valve to modulate the fluid pressure between said inlet and said outlet and to increase the modulation at a linear rate as the fluid pressure at said inlet increases.

9. The combination as set forth in claim 8 wherein said intermediate portion and said flange portion of said pressure responsive member include spaced substantially parallel opposed flat walls joined by spaced curvilinear walls.

10. The combination as set forth in claim 8 including cap means closing one end of said bore, said piston including a stem portion passing through said cap means in fluid tight relationship therewith, the cross-sectional diameter of said stem portion being less than the diameter of said annular rib.

11. The combination as set forth in claim 10 wherein the upper end of said piston is of castellated form and includes a plurality of angularly spaced projections engageable with said body and defining angularly spaced fluid paths therebetween permitting the flow of fluid from said bore to said outlet.

12. The combination as set forth in claim 11 including means providing a fluid tight dynamic seal between said stem portion and said cap means.

13. The combination as set forth in claim 12 wherein the end portion of said annular valve adjacent said seat is of castellated form and is provided with angularly spaced projections defining angularly spaced fluid paths therebetween.

14. The combination as set forth in claim 13 wherein said annular valve includes a depending skirt portion engaging a portion of said body defining said bore and extending in a direction away from said outlet whereby a higher fluid pressure at said inlet than at said outlet will bias said skirt against said body.

* * * * *